United States Patent
Cheung et al.

(10) Patent No.: US 7,883,419 B2
(45) Date of Patent: Feb. 8, 2011

(54) PROXY DEVICE TO PACKETIZE DATA TO SEND TO A WIRELESS NETWORK

(75) Inventors: Gene Cheung, Tokyo (JP); Takashi Sakamoto, Tokyo (JP); Michael Sweeney, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 979 days.

(21) Appl. No.: 11/669,510

(22) Filed: Jan. 31, 2007

(65) Prior Publication Data

US 2008/0182663 A1 Jul. 31, 2008

(51) Int. Cl.
*A63F 13/00* (2006.01)

(52) U.S. Cl. .............................. 463/42; 463/40; 463/43

(58) Field of Classification Search .............. 463/40–43
See application file for complete search history.

(56) References Cited

U.S. PATENT DOCUMENTS

| | | | | |
|---|---|---|---|---|
| 2002/0055385 | A1* | 5/2002 | Otsu ........................... | 463/42 |
| 2002/0077179 | A1* | 6/2002 | Sengoku ...................... | 463/42 |
| 2004/0179469 | A1* | 9/2004 | Attar et al. .................. | 370/208 |
| 2006/0003824 | A1* | 1/2006 | Kobayashi et al. ............. | 463/1 |
| 2007/0171855 | A1* | 7/2007 | Yoneta ........................ | 370/328 |
| 2007/0293320 | A1* | 12/2007 | Nguyen et al. ................ | 463/42 |
| 2008/0102956 | A1* | 5/2008 | Burman et al. ................ | 463/42 |

OTHER PUBLICATIONS

Universal Mobile Telecommunications System (UMTS); Radio Link Control (RLC) protocol specification (3GPP TS.25.322 version 5.12.0 Release 5). http://www.3gpp.org/ftp/Specs/archive/25\_series/25.322/25322-5c0.zip, Sep. 2005.

S. Aggarwal, H. Banavar, and A. Khandelwal,. "Accuracy in dead-reckoning based distributed multi-player games,". in ACM SIGCOMM NetGames, Portland, OR, Aug. 2004.

A. Akkawi, S. Schaller, O. Wellnitz, and L. Wolf,. "A mobile gaming platform for the IMS,". in ACM SIGCOMM NetGames, Portland, OR, Aug. 2004.

H. Balakrishnan, V. Padmanabhan, S. Seshan, and R. Katz,. "A comparison of mechanisms for improving TCP performance over wireless links,". in IEEE/ACM Trans. Networking, vol. 5, No. 6, Dec. 1997.

(Continued)

*Primary Examiner*—James S McClellan
*Assistant Examiner*—Ankit Doshi

(57) ABSTRACT

A data transmission system includes: a data generation device generating data in each time slot; a wireless access device; a proxy device interconnecting the data generation device and the wireless access device via wired network; and a mobile device connected to the wireless access device via wireless network and receiving the generated data. The proxy device includes in a packet the generated data in each time slot or the difference of the generated data between each time slot and a reference time slot associated therewith to generate a packetized data in accordance with data loss rate and data transmission delay in the wireless network and sends the packetized data to the wireless access device. The wireless access device determines an upper limit of retransmissions of the packetized data for the mobile device in accordance with the data loss rate and the data transmission delay in the wireless network.

19 Claims, 4 Drawing Sheets

OTHER PUBLICATIONS

Q. Bi and S. Vitebsky,. "Performance analysis of 3G-1x EvDO high data rate system,". in IEEE Wireless Communications and Networking Conference, Orlando, FL, Mar. 2002.

M. Chen and A. Zakhor,. "AIO-TRFC: A light-weight rate control scheme for streaming over wireless,". in IEEE WirelessCom, Maui, HI, Jun. 2005.

G. Cheung, P. Sharma, and S. J. Lee,. "Striping delay-sensitive packets over multiple bursty wireless channels,". in IEEE International Conference on Multimedia and Expo, Amsterdam, the Netherlands, Jul. 2005.

G. Cheung and W. t. Tan,. "Streaming agent for wired network / wireless link rate-mismatch environment,". in International Workshop on Multimedia Signal Processing, St. Thomas, Virgin Islands, Dec. 2002.

G. Cheung, W. t. Tan, and T. Yoshimura, "Double feedback streaming agent for real-time delivery of media over 3G wireless networks,". in IEEE Transactions on Multimedia, vol. 6, No. 2, pp. 304-314, Apr. 2004.

S. P. et al., "Game transport protocol: A reliable lightweight transport protocol for massively multiplayer on-line games (MMPOGs),". in SPIE-ITCOM, Boston, MA, Jul. 2002.

S. Floyd, M. Handley, J. Padhye, and J. Widmer,. "Equation-based congestion control for unicast applications," in ACM SIGCOMM, Stockholm, Sweden, Aug. 2000.

P. Ghosh, K. Basu, and S. Das, "A cross-layer design to improve quality of service in online multiplayer wireless gaming networks," in IEEE Broadnets, Boston, MA, Oct. 2005.

L. Huang, U. Horn, F. Hartung, and M. Kampmann, "Proxy-based TCP-friendly streaming over mobile networks,". In IEEE International Symposium on a World of Wireless, Mobile and Multimedia Networks, Atlanta, GA, Sep. 2002.

A. Leon-Garcia,. Probability and Random Processes for Electrical Engineering. Addison Wesley, 1994.

M. Meyer, J. Sachs, and M. Holzke,. "Performance evaluation of a TCP proxy in WCDMA networks,". in IEEE Wireless Communications, Oct. 2003.

Nomor Research GmbH. WiSe2. http://www.nomor.de.

F. Yang, Q. Zhang, W. Zhu, and Y.-Q. Zhang,. "Bit allocation for scalable video streaming over mobile wireless internet,". in IEEE Infocom, Hong Kong, Mar. 2004.

T. Yoshimura, T. Ohya, T. Kawahara, and M. Etoh,. "Rate and robustness control with RTP monitoring agent for mobile multimedia streaming,". in IEEE International Conference on Communication, New York, NY, Apr. 2002.

* cited by examiner a) distortion vs. delay
b) utility vs. delay b) utility vs. retrans. limit $B$ a) delay vs. retrans. limit $B$

PROXY DEVICE TO PACKETIZE DATA TO SEND TO A WIRELESS NETWORK

FIELD OF THE INVENTION

The present invention relates to network gaming.

BACKGROUND OF THE INVENTION

There has been very little prior art specifically tailored for game data transport over cellular wireless networks. Research on general data transport over wireless has focused mainly on TCP traffic; game data differs from TCP bulk transfer in that they are extremely data-sensitive, and thus TCP transport optimization in general cannot be applied directly to game data transport. There has been some recent work on proxy based optimizations for streaming media. Game data differs in that the time required to transport the data is inversely proportional to the utility of the data—variable-deadline data; in contrast, streaming media like video must be delivered by a playback deadline when it is fully consumed—fixed deadline data. Our proxy work can be viewed as an novel extension of these work. Finally, there are some works on gaming protocol over general networks; our work instead focuses on the particulars of the 3G wireless networks. See section 2 for a more comprehensive overview of related work.

SUMMARY OF INVENTION

Unlike non-time-critical applications like email and file transfer, network games demand timely data delivery to maintain the seemingly interactive presence of players in the virtual game world. Yet the inherently large transmission delay mean and variance of 3G cellular links make on-time game data delivery difficult. Further complicating the timely game data delivery problem is the frequent packet drops at these links due to inter-symbol interference, fading and shadowing at the physical layer. In this paper, we propose a proxy architecture that enhances the timeliness and reliability of data delivery of interactive games over 3G wireless networks. In particular, a performance enhancing proxy is designed to optimize a new time-critical data type —variable-deadline data, where the utility of a datum is inversely proportional to the time required to deliver it. We show how a carefully designed and configured proxy can noticeably improve the delivery of network game data.

BRIEF DESCRIPTION OF THE DRAWINGS

The accompanying drawings, which are incorporated in the form a part of this specification, illustrate embodiments of the invention by way of example and not by way of limitation. The drawings referred to in this specification should be understood as not being drawn to scale except if specifically noted.

DETAILED DESCRIPTION OF THE INVENTION

1. Introduction

Figure 1:
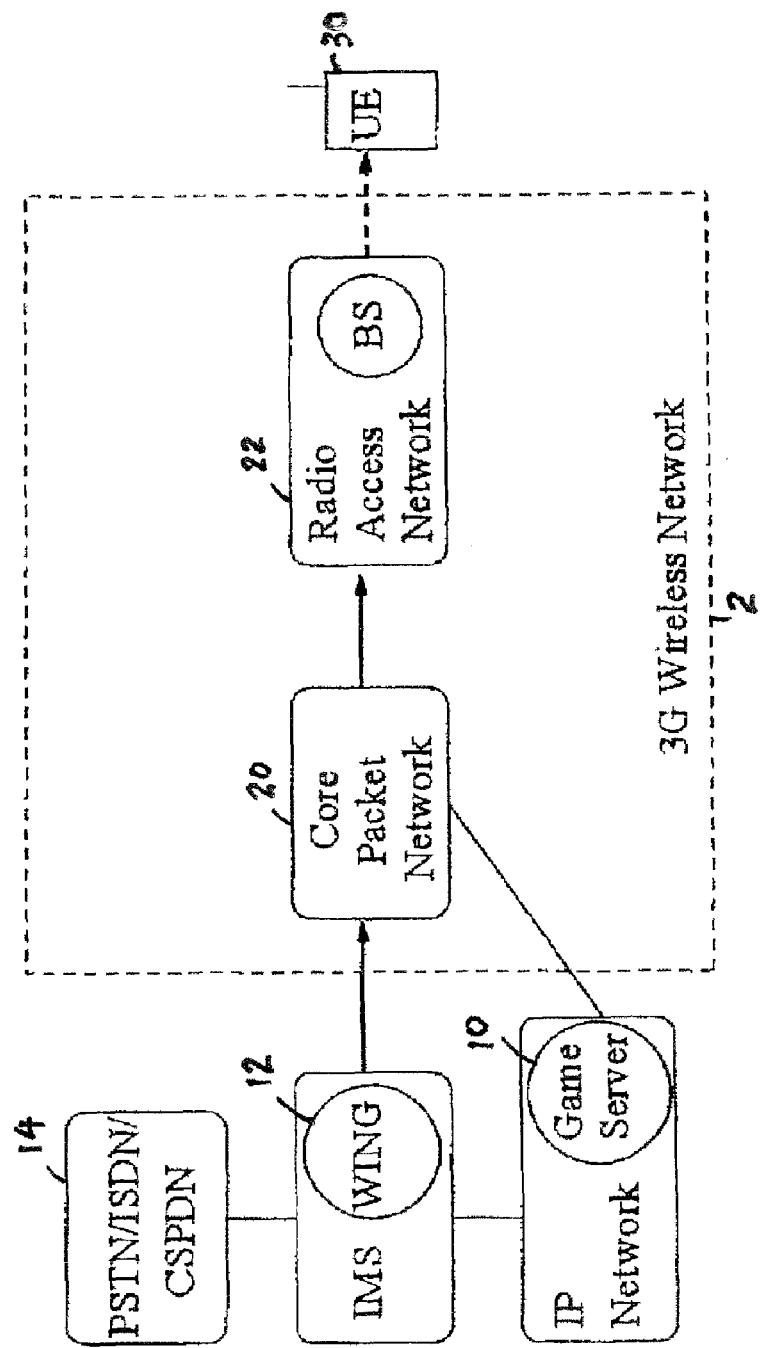
FIG. 1 is a block diagram of online game system.

FIG. 1 is a block diagram of online game system.

As shown in FIG. 1, the online game system 1 includes game server 10, WING 12, 3G wireless network 2 and mobile users (UE) 30.

The 3G wireless network 2 includes core packet network 20 and radio access network 22.

The WING 12 is connected to PSTN/ISDN/CSPDN 14 and 3G wireless network 2.

UE 30 is connected to 3G wireless network 2.

While network gaming has long been projected to be an application of massive economic growth, as seen in the recent explosive development on the wired Internet in South Korea and Japan, deployment of similar network games on 3G wireless networks 2 continues to be slow and difficult. One reason is that unlike their wired counterparts, wireless links are notoriously prone to errors due to channel fading, shadowing and inter-symbol interference. While 3G wireless networks 2, such as High Speed Downlink Packet Access (HSDPA) of 3rd Generation Partnership Project (3GPP) Release 5 (R5) [1] and CDMA 1x EvDO of 3GPP2 [5], combat wireless link failures at the MAC and physical layer with an elaborate system of channel coding, retransmission, modulation and spreading, with resulting packet loss rate being reduced to negligible 1 to 2%, the detrimental side-effect to network gaming is the large and often unpredictable transmission delay mean and variance [15]. Such large and variable delays greatly reduce the necessary interactivity of network game players and deteriorate the overall gaming experience.

In a separate development, a new 3G network element called IP Multimedia Subsystem (IMS) [3] has been introduced in 3GPP specifications R5 and later, as shown in FIG. 1.

The Session Initiation Protocol (SIP)-based IMS provides a multitude of multimedia services: from establishing connections from the legacy telephone networks to the new IP core network using Voice over IP (VoIP), to delivering streaming services such as video as a value-added service to mobile users (UE 30). Strategically located as a pseudo-gateway to the private and heavily provisioned 3G networks, it is foreseeable that IMS will continue to enlarge and enrich its set of multimedia services in future wireless networks.

In this specification, we propose a performance enhancing proxy (PEP) called (W)ireless (I)nteractive (N)etwork (G)aming Proxy (WING) 12 to improve the timely delivery of network game data in 3G wireless networks 2. WING 12 is located inside IMS as an application service on top of the myriad of services that IMS already provides. In a nutshell, WING 12 improves the delivery of game data from the game server 10 to 3G wireless game players (While peer-to-peer model for interactive network games is also possible, we assume the more common server-client model where the game server 10 maintains and disseminates all game states in this specification) using the following three techniques. First, by virtue of locating at the intersection of the private wireless network and the open Internet, connection from the game server 10 to the wireless game player can be strategically split; for the server-WING 12 connection, only the statistically stable and fast round-trip time (RTT) and low wired-network-only packet loss rate (PLR) are used for congestion control, resulting in a steady yet TCP-friendly server-WING 12 connection. Second, by configuring parameters in the radio link layer (RLC) specifically for gaming during session setup, excessive RLC retransmissions are avoided, and timeliness of game data is improved at the controlled expense of increased packet losses. Finally, by constructing small but error-resilient packets that contain location data, packets can be transmitted in fewer MAC-layer protocol data units (PDU) and hence further reduces delay.

The specification is organized as follows. Related work is presented in Section 2. We overview the 3G wireless system in focus, HSDPA of 3GPP R5, in Section 3. Note that because similar link and MAC layer transport optimizations that chiefly affect delay mean and variance are also employed in other 3G networks, our proposed WING 12 can conceivably be applied to other wireless networks such as CDMA 1x EvDO of 3GPP2. We discuss the design of WING 12 in details in Section 4. Finally, experimental results and conclusion are provided in Section 5 and 6, respectively.

2. Related Work

We divide the discussion on the large volume of related work into two section. Section 2.1 discusses related research on wireless transport optimization. Section 2.2 discusses related research in transport of network game data.

2.1 Wireless Transport Optimization

We note that proxy-based transport optimization for last-hop wireless networks has a long history, with the majority of the research [4, 15] focusing on optimization of TCP over last-hop wireless networks. In particular, [15] showed that while 3G network packet losses can indeed be successfully overcome by using ample link layer retransmissions, the resulting large RTT mean and variance may severely affect the performance of a TCP-like congestion avoidance rate control that is based on end-to-end observable statistics of RTT and PLR. The limiting rate constraint and undesirable fluctuations can be alleviated using a proxy with split-connection—a theme we develop in Section 4.2.

Recently, efforts on proxy design have shifted to delay-sensitive multimedia transport [18, 13, 8, 9], though all of them focused exclusively on streaming media, while we focus on network gaming. Note that due to cited complexity reason, a competing end-to-end approach for rate control that does not rely on an intermediate proxy is popular as well [17, 6]. However, we chose the proxy-based approach and will juxtapose its advantages in Section 4.2.

2.2 Transport of Network Game Data

In [3], a general gaming platform for IMS that provides network services needed for network gaming such as session setup and registration is proposed to ease deployment over 3G networks. Our work is orthogonal to [3] since we focus only on the efficient transport of game data.

An early work on gaming protocol is [10], which defined a Game Transport Protocol (GTP) for massive multi-player on-line games (MMPOGs) over the Internet. Our proposed gaming proxy WING 12 differs in the following respects: i) we design WING 12 specifically for lossy, bandwidth-limited networks, hence focusing on design of network-optimized differential coding to produce small but loss-resilient packets; and, ii) we tailor WING 12 for HSDPA of 3G wireless networks 2, optimizing performance by intelligently configuring parameters of the RLC layer.

The most similar related work is [12], which proposed an end-to-end adaptive FEC and dynamic packetization algorithm to combat packet losses due to wireless link failures and reduce packet sizes. Unlike [12], our approach is proxy-based, and we tailor our gaming optimization exclusively for 3G networks.

3. Overview of UMTS Release 5

HSDPA of UMTS Release 5, also known as 3.5G, improves upon Release 4 with numerous lower-layer optimizations. First, a shared channel is periodically scheduled to users in the cell with good observable network conditions to take advantage of user diversity during fading without sacrificing fairness. Second, an elaborate MAC-layer scheme chooses an appropriate combination of FEC, hybrid ARQ, modulation and spreading based on client observable network state. In this section, we instead focus on the RLC layer, where the user has limited control over channel behavior using configuration of parameters during session setup.

The Radio Link control (RLC) layer [1] buffers upper layer service data units (SDU) on a per-session basis—IP packets in this case, and segments each SDU into smaller protocol data units (PDU) of size $S_{PDU}$ and await transmission at lower layers. There are three transmission modes: transparent mode (TM), unacknowledged mode (UM) and acknowledged mode (AM). Only AM performs link-layer retransmissions if transmission in the lower layer fails. For error resiliency, we focus only on AM. In particular, we look at how SDUs are discarded in the RLC layer: using a method of retransmission-based discard (RBD), an SDU can be discarded before successful transmission. In a nutshell, an SDU is discarded if a pre-defined maximum number of retransmissions B has been reached before successful transmission of a PDU belonging to the SDU. We will investigate how the value B can be selected to trade off error resiliency with delay in Section 4.3.

4. WING for Wireless Interactive Network Gaming

Before we discuss the three optimizations of our proposed gaming proxy WING 12 in details in Section 4.2, 4.3 and 4.4, we first define a new type of transport data called "variable deadline data" in Section 4.1—a consequence of a prediction procedure used at a network game client to predict locations of other game players in the virtual game world.

4.1 Variable Deadline Data Delivery

Unlike media streaming applications where a data unit containing media data is fully consumed if it is correctly delivered by a playback deadline and useless otherwise [9], the usefulness (utility) of a game datum is inversely proportional to the time it requires to deliver it. This relationship between utility and transmission delay is the behavioral result of a commonly used game view reconstruction procedure at a game client called "dead-reckoning" [2]. It works as follows. To maintain time-synchronized virtual world views among game players at time $t_0$, a player $P_A$ predicts the location $\bar{\xi}_{t_0}$ of another player $P_B$ and draws it in $P_A$ virtual world at time $t_0$, extrapolating from previously received location updates of $P_B$ in the past, $\xi_\tau$, $\tau<t_0$. When location update $\xi_{t_0}$ arrives at $P_A$ from $P_B$ at a later time $t_1$, $P_A$ updates its record of $P_B$'s locations with $(t_0, \xi_{t_0})$, in order to make an accurate prediction of $$(t_1, \bar{\xi}_{t_1})$$

for display in $P_A$'s virtual world at time $t_1$. Regardless of what prediction method is used at the client, it is clear that a smaller transmission delay will in general induce a smaller prediction error, or distortion. We term this type of data with inversely proportional relationship between quantifiable utility and delay "variable deadline data". We next show examples of how such utility-delay curve u(d) can be derived in practice given a player movement model and a prediction method.

4.1.1 Examples of Dead-Reckoning

We first consider two simple movement models that model a game player in two-dimensional space (x, y). The first is "random walk", where for each time increment t, probability mass function (pmf) of random variable of x-coordinate $x_t$, $p(x_t)$, is defined as follows:

$$p(x_{t+1} = x_t + 1) = 1/3 \quad (1)$$
$$p(x_{t+1} = x_t) = 1/3$$
$$p(x_{t+1} = x_t - 1) = 1/3$$

Random variable of y-coordinate $y_t$ is calculated similarly and is independent of $x_t$.

The second movement model is "weighted random walk", whose pmf is defined as follows:

$$p(x_{t+1} = x_t + ((x_t - x_{t-1} + 1) \bmod 2)) = 1/6 \quad (2)$$
$$p(x_{t+1} = x_t + (x_t - x_{t-1})) = 2/3$$
$$p(x_{t+1} = x_t + ((x_t - x_{t-1} - 1) \bmod 2)) = 1/6$$

In words, the player continues the same movement as done in the previous instant with probability ⅔, and changes to one of two other movements each with probability ⅙. Random variable y-coordinate $y_t$ is calculated similarly.

Figure 2:
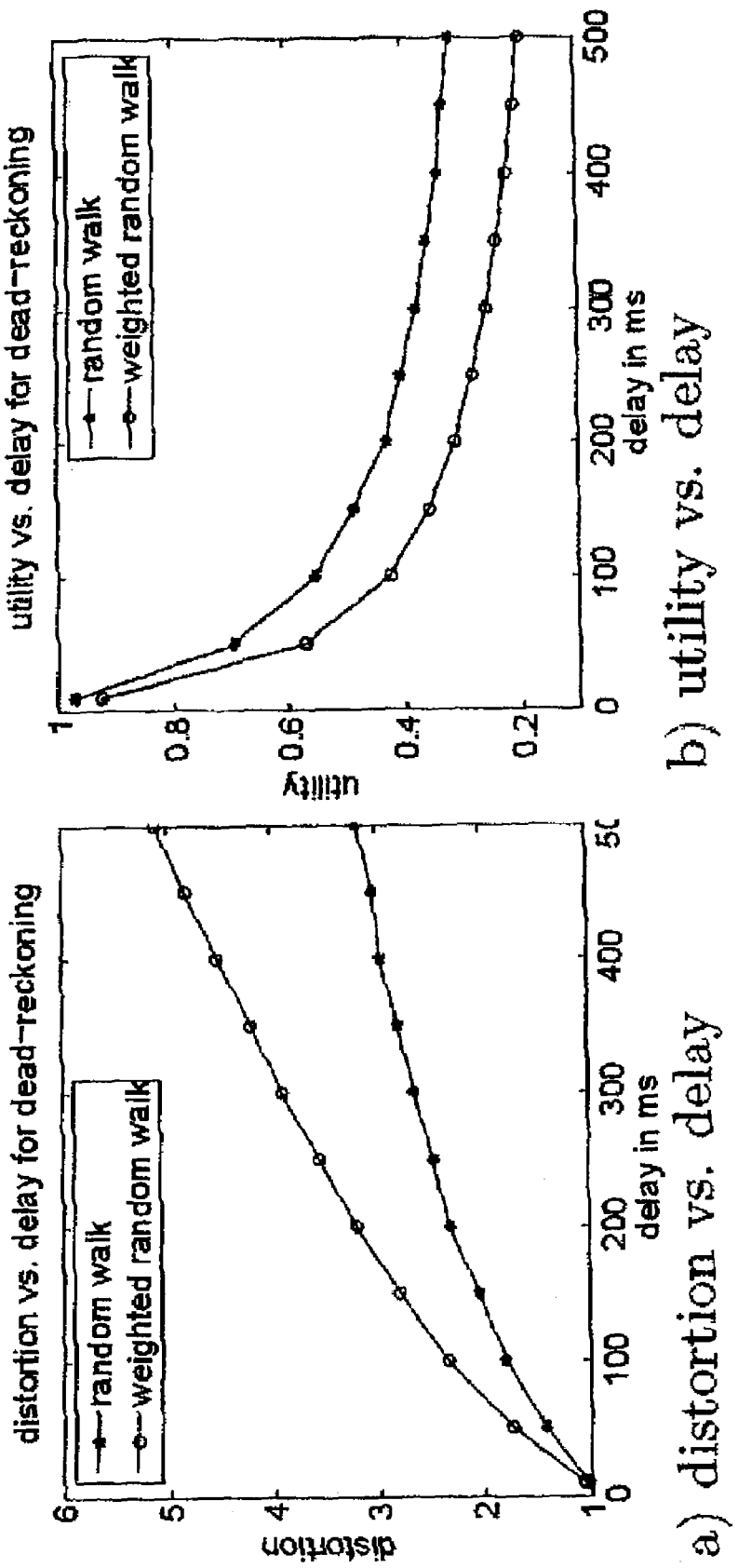
FIG. 2 is an illustration of performance vs. transmission when dead-reckoning is employed at the client side

We defined a simple prediction method called "0th-order prediction" as follows: each unknown $x_t$ is simply set to the most recently updated $x_\tau$. Using each of the two movement models in combination with the prediction method, we constructed distortion-delay curves experimentally as shown in FIG. 2a. As seen, 0th-order prediction is a better match to random walk than weighted random walk, inducing a smaller distortion for all delay values. Utility u(d)—shown in FIG. 2b—is simply the reciprocal of distortion. Having derived u(d) gives us a quantifiable metric on which we can objectively evaluate game data transport systems.

4.2 Proxy-based Congestion Control

We argue that by locating WING 12 (FIG. 1) between the open wired Internet (IP network) and the provisioned wireless networks (3G wireless network 2) to conduct split-connection data transfer, stable TCP-friendly congestion control can be maintained on top of UDP in the wired server-WING 12 connection. Traditional congestion control algorithms like TCP-friendly Rate Control (TFRC) [11] space outgoing packets with interval $T_{cc}$ as a function of estimated packet loss rate (PLR) $\epsilon_{cc}$, RTT mean $m_{cc}$ and RTT variance $\sigma_{cc}^2$ due to wired network congestion:

$$T_{cc} = m_{cc}\sqrt{2\epsilon_{cc}/3} + 3(m_{cc} + 4\sigma_{cc}^2)\epsilon_{cc}(1 + 32\epsilon_{cc}^2)\sqrt{3\epsilon_{cc}/8} \quad (3)$$

Past end-to-end efforts [17, 6] have focused on methodologies to distinguish wired network congestion losses from wireless link losses, in order to avoid unnecessary rate reduction due to erroneous perception of wireless losses as network congestion. Split connection offers the same effect regarding PLR by completely shielding sender from packet losses due to wireless link failures. Moreover, by performing TFRC (3) in the server-WING 12 connection using only stable wired network statistics, split connection shields the server-WING 12 connection from large rate fluctuations due to large RTT variance in the last-hop 3G link as shown in [15]. For this reason, [15] showed experimentally that indeed proxy-based split-connection congestion control performs better than end-to-end counterparts, even in negligible wireless loss environments.

Lastly, we note that split connection can benefit from a "rate-mismatch" environment [8, 9], where the available bandwidth $R_1$ in the server-WING 12 connection is larger than the available bandwidth $R_2$ in the WING 12-client connection. In such case, the surplus bandwidth $R_1$-$R_2$ can be used for redundancy packets like forward-error correction (FEC) or retransmission to lower PLR in the server-WING 12 connection. We refer interested readers to [8, 9] for further details.

4.3 Optimizing RLC Configuration

Prior to the start of the game session, our proposed game proxy will appropriately set the maximum number of retransmissions at the Radio Link Control (RLC) layer. An appropriately selected number of retransmissions, resulting in an associated queuing and transmission delay, optimizes the expected utility of delivered game data.

The optimization of RLC configuration is performed between the radio access network 22 in the 3G wireless network 2 and the UE 30 (FIG. 1) by setting parameters for it.

Given utility-delay function u(d) in Section 4.1, we optimize configuration of RLC to maximize utility. More precisely, we pick the value of maximum retransmission limit B—inducing expected SDU loss rate l* and delay d*, so that the expected utility $(1-l^*)u(d^*)$ is maximized.

We assume a known average SDU size $S_{SDU}$, PDU loss rate $\epsilon_{PDU}$, and probability density function (pdf) of PDU transmission delay $\Phi(\phi)$ with mean $m_\phi$ and variance $\sigma_\phi^2$.

First, the expected number of PDUs fragmented from an SDU is $$N = \left\lceil \frac{S_{SDU}}{S_{PDU}} \right\rceil.$$

For a given B, the expected SDU loss rate $l_{SDU}$ can be written simply:

$$P_{PDU} = \sum_{i=1}^{B} \epsilon_{PDU}^{i-1}(1 - \epsilon_{PDU}) \quad (4)$$

$$l_{SDU} = 1 - P_{PDU}^N \quad (5)$$

where $P_{PDU}$ is the probability that a PDU is successfully delivered given B.

The delay $d_{SDU}$ experienced by a successfully delivered SDU is the sum of queuing delay $d^q_{SDU}$ and transmission delay $d^t_{SDU}$. Queuing delay $d^q_{SDU}$ is the delay experienced by an SDU while waiting for head-of-queue SDUs to clear due to early termination or delivery success. $d^t_{SDU}$ is the expected wireless medium transmission delay given the SDU is successfully delivered. $d^t_{SDU}$ is easier and can be calculated as:

$$X_{PDU} = \frac{1}{P_{PDU}} \sum_{i=1}^{B} i\epsilon_{PDU}^{i-1}(1 - \epsilon_{PDU}) \quad (6)$$

$$d^t_{SDU} = Nm_\phi X_{PDU} \quad (7)$$

where $X_{PDU}$ is the expected number of PDU (re)transmissions given PDU delivery success. To calculate $d^q_{SDU}$ we assume a M/G/1 queue (Our system is actually more similar to a D/G/1 queue, since the arrivals of game data are more likely to be deterministic than Markovian. Instead, we use M/G/1 queue as a first-order approximation.) with arrival rate $\lambda_q$, mean service time $m_q$, and variance of service time $\sigma_q^2$. Using Pollaczek-Khinchin mean value formula [14], $d^q_{SDU}$ can be written as:

$$d^q_{SDU} = \frac{\lambda_q m_q (1 + \sigma_q^2 / m_q^2)}{2(1 - \lambda_q m_q)} m_q \quad (8)$$

In our application, $\lambda_q$ is the rate at which game data arrive at WING 12 from the server, which we assume to be known. $m_q$ is the mean service rate for both cases of SDU delivery success and failure and can be derived as follows:

$$Y_{SDU} = \frac{1}{l_{SDU}} \sum_{i=1}^{N} (B + (i-1)X_{PDU}) \epsilon^B_{PDU} P^{i-1}_{PDU} \quad (9)$$

$$m_q = (1 - l_{SDU})d^t_{SDU} + l_{SDU} m_\phi Y_{SDU} \quad (10)$$

where $Y_{SDU}$ is the expected total number of PDU (re)transmissions in an SDU given SDU delivery failure. Similar analysis will show that the variance of service rate $\sigma_q^2$ for our application is:

$$\sigma_q^2 = (1 - l_{SDU})N^2 X_{PDU}^2 \sigma_\phi^2 + l_{SDU} Y_{SDU}^2 \sigma_\phi^2 \quad (11)$$

We can now evaluate expected queuing delay $d^q_{SDU}$ from which we evaluate expected delay $d_{SDU}$. Optimal B* is one that maximizes left$(1-l^*_{SDU})u(d^*_{SDU})$.

4.4 Loss-optimized Differential Coding

The proxy performs the repacketization of game data using loss-optimized differential coding. This is done to achieve two objectives simultaneously: i) to reduce the transmission time by reducing the size of the data packet and hence the number of lower layer packet fragmentation; and, ii) to avoid error propagation due to dependency introduced by traditional differential coding.

The WING 12 (FIG. 1) performs the loss-optimized differential coding by re-packetizing the data from the game server 10 to the UE 30. The WING 12 sets mode indication bits in data packets to notify the UE 30 of the mode of loss-optimized differential coding (refer to table 1 below). The UE 30 decodes the received packets based on the mode indication bits.

If the location data—player position updates sent to improve dead-reckoning discussed in Section 4.1—are in absolute values, then the size of the packet containing the data can be large, resulting in large delay due to many PDU fragmentation and spreading. The alternative is to describe the location in relative terms—the difference in the location from a previous time slot. Differential values are smaller, resulting in fewer encoded bits and smaller packets, and hence smaller transmission delay. This "differential coding" of location data is used today in networked games.

The obvious disadvantage of differential coding is that the created dependency chain is vulnerable to network loss; a single loss can result in error propagation until the next absolute location data (refresh).

Figure 3:
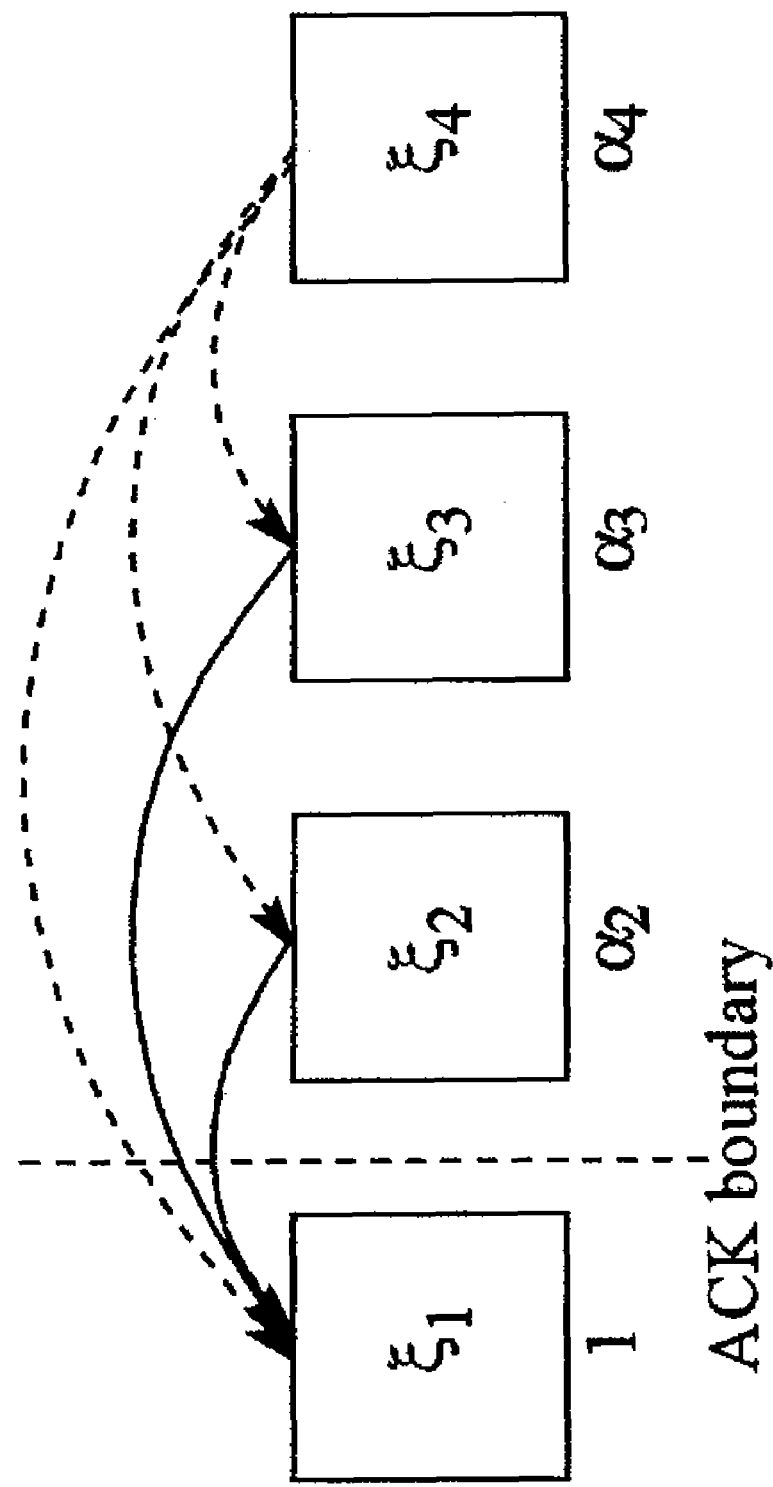
FIG. 3 is an illustration of differential coding.

To lessen the error propagation effect while maintaining the coding benefit of differential coding, one can reference a position in an earlier time slot. An example is shown in FIG. 3, where we see position $3(\xi_3)$ references $\xi_1$ instead of $\xi_2$. This way, loss of packet containing $\xi_2$ will not affect $\xi_3$, which depends only on $\xi_1$. The problem is then: for a new position $\xi_t$, how to select reference position $\xi_{t-r}$ for differential coding such that the right tradeoff of error resilience and packet size can be selected? This selection must be done in an on-line manner as new position becomes available from the application to avoid additional delay.

4.4.1 Specifying Coding Modes

TABLE 1

| mode | mode marker | ref. size | coord. size | total |
|---|---|---|---|---|
| 0 | 00 | 0 | 32 | 2 + 64n |
| 1 | 01 | 0 | 16 | 2 + 32n |
| 2 | 10 | 2 | 8 | 4 + 16n |
| 3 | 11 | 4 | 4 | 6 + 8n |

Table 1 shows an example of differential coding.

To implement loss-optimized differential coding, we first define a coding specification that dictates how the receiver should decode location packets. For simplicity, we propose only four coding modes, where each mode is specified by a designated bit sequence (mode marker) in the packet. Assuming the original absolute position $\xi$ is specified by two 32-bit fixed point numbers, mode 0 encodes the unaltered absolute position in x-y order, resulting in data payload size of 2+64n bits for n game entities. Mode 1 uses the previous position as reference for differential encoding with 16 bits per coordinate, resulting in 2+32n bits for n entities. Mode 2 uses the first 2 bits to specify r in reference position t-r for differential encoding. Each coordinate takes 8 bits, resulting in 4+16n total bits for n entities. Mode 3 is similar to mode 2 with the exception that each of the reference marker and the two coordinate takes only 4 bits to encode, resulting in 6+8n bits for n entities.

For given position $\xi_t = (x_t, y_t)$ and reference $\xi_{t-r} = (x_{t-r}, y_{t-r})$, some modes may be infeasible due to the fixed coding bit budgets for reference and coordinate sizes. So limited to the set of feasible modes, we seek a reference position/mode pair that maximizes an objective function.

4.4.2 Finding Optimal Coding Modes

For an IP packet of size $s_t$ containing position $\xi_t$ that is sent at time t, we first define the probability that it is correctly "delivered" by time $\tau$ as $\alpha_t(\tau)$. $\alpha_t(\tau)$ depends on expected PLR $l(s_t)$ and delay $d(s_t)$, resulting from retransmission limit B chosen in Section 4.3:

$$N(s_t) = \left\lceil \frac{s_t}{S_{PDU}} \right\rceil \quad (12)$$

$$l(s_t) = 1 - (P_{PDU})^{N(s_t)} \quad (13)$$

$$d(s_t) = d^q_{SDU} + N(s_t) m_\phi X_{PDU} \quad (14)$$

where $N(s_t)$ is the number of PDUs fragmented from an SDU of size $s_t$. $l(s_t)$ is PLR in (5) generalized to SDU size $s_t$.

d($s_t$) is the expected queuing delay in (8) plus the transmission delay in (7) generalized to SDU size $s_t$. We can now approximate $\alpha_t(\tau)$ as:

$$\alpha_t(\tau) \approx \begin{cases} 1 & \text{if } ACKed \text{ by } \tau \\ (1 - l(s_t))1(\tau - t - d(s_t)) & o.w. \end{cases} \quad (15)$$

where $l(x)=1$ if $x \geq 0$, and $=0$ otherwise. If no acknowledgment packets (ACK) are sent from client to WING 12, then $\alpha_t(\tau)$ is simply the second case in (15).

We next define the probability that position $\xi_t$ is correctly "decoded" by time $\tau$ as $P_t(\tau)$. Due to dependencies resulting from differential coding, $P_t(\tau)$ is written as follows:

$$P_t(\tau) = \alpha_t(\tau) \prod_{j \prec t} \alpha_j(\tau) \quad (16)$$

where $j \prec t|$ is the set of positions j's that precedes t in the dependency graph due to differential coding.

Given utility function u(d) in Section 4.1 and decode probability (16), the optimal reference position/mode pair is one that maximizes the following objective function:

$$\max P_t(t+d(s_t))u(d(s_t)) \quad (17)$$

It should be noted that the coding modes have different packet sizes as can be seen from the rightmost column of Table 1, "total" column, and so change in the reference position/mode will change not only $P_t(t+d(s_t))$ but also $u(d(s_t))$ in formula (17).

5. Experimentation

TABLE 2

|  | PLR | RTT mean | RTT variance |
| --- | --- | --- | --- |
| Tokyo-Singapore (50) | 0 | 94.125 ms | 178.46 |
| Tokyo-Singapore (100) | 0 | 95.131 ms | 385.30 |
| Tokyo-Singapore (200) | 0 | 96.921 ms | 445.63 |
| HSDPA (50) | 0 | 62.232 ms | 7956.8 |
| HSDPA (100) | 0 | 72.547 ms | 25084 |
| HSDPA (200) | 0 | 152.448 ms | 143390 |

We first present network statistics for HSDPA and discuss the implications. We collected network statistics of 10,000 ping packets, of packet size 50, 100 and 200 bytes, spaced 200 ms apart, between hosts in Tokyo and Singapore inside HP intranet. The results are shown in Table 2. We then conducted the same experiment over a network emulator called WiNe2 [16] emulating the HSDPA link with 10 competing ftp users each with mobility model Pedestrian A. We make two observations in Table 2. One, though results from both experiments had similar RTT means, HSDPA's RTT variances were very large, substantiating our assertion that using split-connection to shield the server-WING 12 connection from HSDPA's RTT variance would drastically improve TFRC bandwidth (3) of server-WING 12 connection.

Two, larger packets entailed larger RTT means for HSDPA. This means that the differential coding discussed in Section 4.4 indeed has substantial performance improvement potential.

TABLE 3

| number of entities n | 4 |
| --- | --- |
| frame rate | 10 fps |
| IP + UDP header | 20 + 8 bytes |
| RLC PDU size | 40 bytes |
| RLC PDU loss rate | 0.1 to 0.3 |
| average packet size | 61 bytes |
| shifted Gamma parameter $\alpha_g$ | 2 |
| shifted Gamma parameter $\lambda_g$ | 0.1 |
| shifted Gamma parameter $\kappa_g$ | 10.0 |

We next used an internally developed network simulator called (mu)lti-path (n)etwork (s)imulator muns that was used in other simulations [7] to test RLC configurations and differential coding. For PDU transmission delay $\Phi(\phi)$, we used a shifted Gamma distribution:

$$\Phi(\phi) = \frac{\lambda_g^{\alpha_g}(\phi - \kappa_g)^{\alpha_g - 1} e^{-\lambda_g(\phi - \kappa_g)}}{\Gamma(\alpha_g)}, \quad (18)$$

$$\kappa_g < \phi < \infty$$

where $\Gamma(\alpha)$ is the Gamma function [14]. The parameters used are shown in Table 3.

Figure 4:
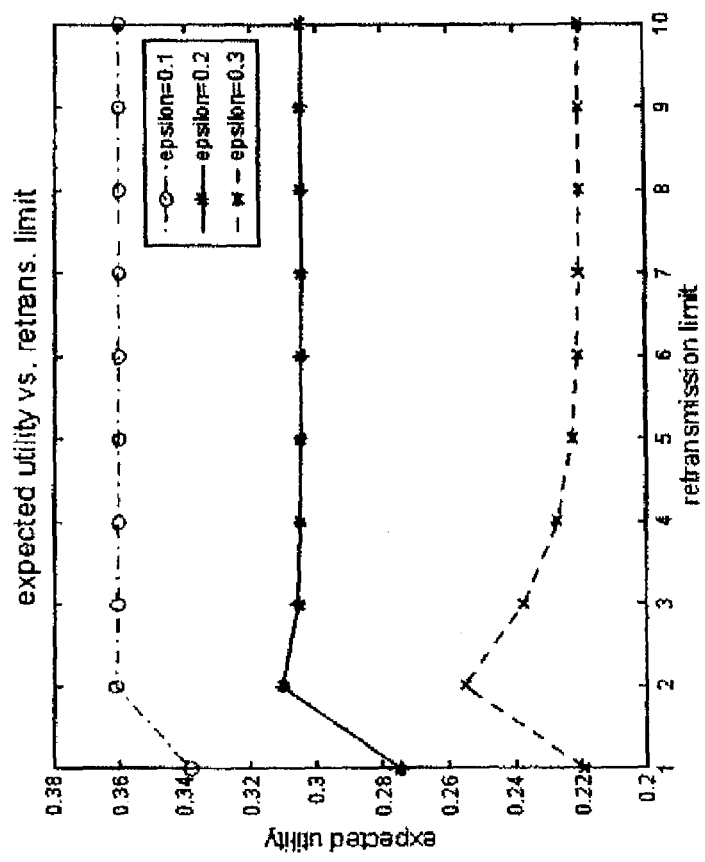
FIG. 4 is an illustration of the expected delay and utility as a function of retransmission limit B for different PDU loss rates.
Figure 4:
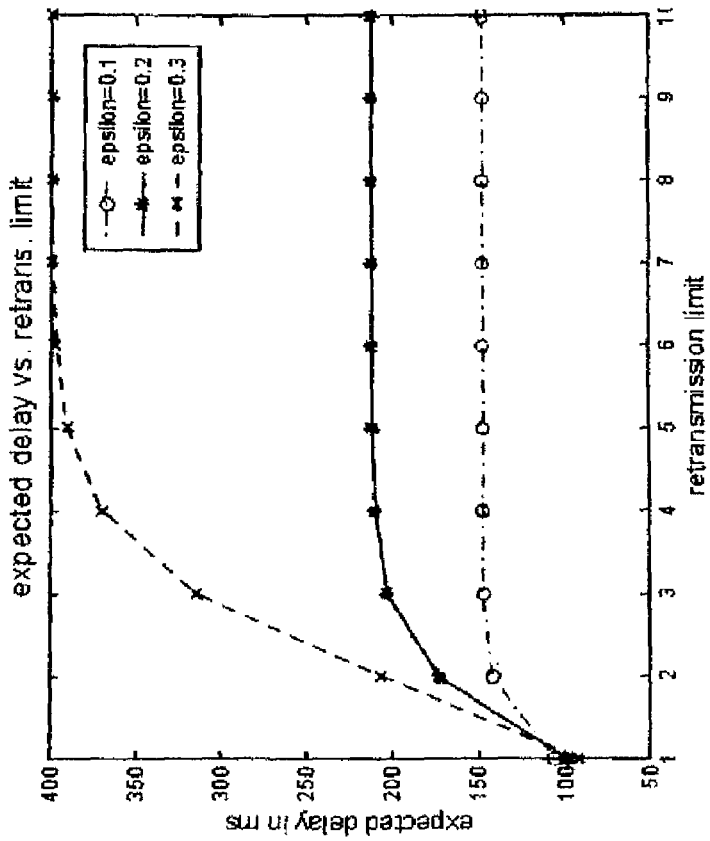

FIG. 4 shows the expected delay and utility as a function of retransmission limit B for different PDU loss rates. As expected, when B increases, the expected delay increases. The expected utility, on the other hand, reaches a peak and decreases. For given PDU loss rate, we simply select B with the largest expected utility.

TABLE 4

| εPDU | B* | abs (1) | abs (B*) | rel (1) | rel (B*) | opt |
| --- | --- | --- | --- | --- | --- | --- |
| 0.10 | 2 | 1.181 | 1.134 | 1.806 | 1.154 | 1.070 |
| 0.15 | 3 | 1.222 | 1.166 | 2.288 | 1.108 | 1.073 |
| 0.20 | 2 | 1.290 | 1.192 | 2.619 | 1.380 | 1.086 |
| 0.25 | 2 | 1.356 | 1.232 | 3.035 | 1.568 | 1.090 |
| 0.30 | 2 | 1.449 | 1.268 | 3.506 | 1.750 | 1.110 |
| 0.35 | 2 | 1.509 | 1.300 | 3.556 | 2.054 | 1.121 |

Next, we compare the results of our loss-optimized differential coding optimization opt in Section 4.4 with two schemes: abs, which always encodes in absolute values; and, rel, which uses only previous frame for differential coding and refreshes with absolute values every 10 updates. abs represents the most error resilient coding method in differential coding, while rel represents a reasonably coding-efficient method with periodical resynchronization. Note, however, that neither abs nor rel adapts differential coding in real time using client feedbacks.

abs and rel were each tested twice. In the first trial, limit B was set to 1, and in the second, B was set to the optimal configured value as discussed in Section 4.3. 20000 data points were generated and averaged for each distortion value in Table 4. As we see in Table 4 for various PDU loss rate $\epsilon_{PDU}$, the resulting distortions for opt were always lower than abs's and rel's, particularly for high PDU loss rates. opt performed better than rel because of opt's error resiliency of loss-optimized differential coding, while opt performed better than abs because opt's smaller packets induced a smaller queuing delay and a smaller transmission delay due to smaller number of RLC fragmentations. This demonstrates that it is important not only to find an optimal RLC configuration, but a suitable differential coding scheme to match the resulting loss rate and delay of the configuration.

6. Conclusion

We propose a performance enhancing proxy called WING 12 to improve the delivery of game data from a game server 10 to 3G game players using three techniques: i) split-connection TCP-friendly congestion control, ii) network game optimized RLC configuration, and, iii) packet compression using differential coding. For future, we will investigate how similar techniques can be applied for the 3G uplink from game player to game server 10.

7. Reference

[1] Universal Mobile Telecommunications System (UMTS); Radio Link Control (RLC) protocol specification (3GPP TS.25.322 version 5.12.0 Release 5). http://www.3gpp.org/ftp/Specs/archive/25\_series/25.322/25322-5c0.zip, September 2005.

[2] S. Aggarwal, H. Banavar, and A. Khandelwal,. "Accuracy in dead-reckoning based distributed multi-player games,". in *ACM SIGCOMM NetGames*, Portland, Oreg., August 2004.

[3] A. Akkawi, S. Schaller, O. Wellnitz, and L. Wolf,. "A mobile gaming platform for the IMS,". in *ACM SIGCOMM NetGames*, Portland, Oreg., August 2004.

[4] H. Balakrishnan, V. Padmanabhan, S. Seshan, and R. Katz,. "A comparison of mechanisms for improving TCP performance over wireless links,". in *IEEE/ACM Trans. Networking*, volume 5, no.6, December 1997.

[5] Q. Bi and S. Vitebsky,. "Performance analysis of 3G-1x EvDO high data rate system,". in *IEEE Wireless Communications and Networking Conference*, Orlando, Fla., March 2002.

[6] M. Chen and A. Zakhor,. "AIO-TRFC: A light-weight rate control scheme for streaming over wireless,". in *IEEE WirelessCom*, Maui, Hi., June 2005.

[7] G. Cheung, P. Sharma, and S. J. Lee,. "Striping delay-sensitive packets over multiple bursty wireless channels,". in *IEEE International Conference on Multimedia and Expo*, Amsterdam, the Netherlands, July 2005.

[8] G. Cheung and W. t. Tan,. "Streaming agent for wired network/wireless link rate-mismatch environment,". in *International Workshop on Multimedia Signal Processing*, St. Thomas, Virgin Islands, December 2002.

[9] G. Cheung, W. t. Tan, and T. Yoshimura, "Double feedback streaming agent for real-time delivery of media over 3G wireless networks,". in *IEEE Transactions on Multimedia*, volume 6, no.2, pages 304-314, April 2004.

[10] S. P. et al., "Game transport protocol: A reliable lightweight transport protocol for massively multiplayer online games (MMPOGs),". in *SPIE-ITCOM*, Boston, Mass., July 2002.

[11] S. Floyd, M. Handley, J. Padhye, and J. Widmer,. "Equation-based congestion control for unicast applications," in *ACM SIGCOMM*, Stockholm, Sweden, August 2000.

[12] P. Ghosh, K. Basu, and S. Das, "A cross-layer design to improve quality of service in online multiplayer wireless gaming networks," in *IEEE Broadnets*, Boston, Mass., October 2005.

[13] L. Huang, U. Horn, F. Hartung, and M. Kampmann, "Proxy-based TCP-friendly streaming over mobile networks,". In *IEEE International Symposium on a World of Wireless*, Mobile and Multimedia Networks, Atlanta, Ga., September 2002.

[14] A. Leon-Garcia,. *Probability and Random Processes for Electrical Engineering*. Addison Wesley, 1994.

[15] M. Meyer, J. Sachs, and M. Holzke,. "Performance evaluation of a TCP proxy in WCDMA networks,". in *IEEE Wireless Communications*, October 2003.

[16] Nomor Research GmbH. WiSe2. http://www.nomor.de.

[17] F. Yang, Q. Zhang, W. Zhu, and Y.-Q. Zhang,. "Bit allocation for scalable video streaming over mobile wireless internet,". in *IEEE Infocom*, Hong Kong, March 2004.

[18] T. Yoshimura, T. Ohya, T. Kawahara, and M. Etoh,. "Rate and robustness control with RTP monitoring agent for mobile multimedia streaming,". in *IEEE International Conference on Communication*, New York, N.Y., April 2002.

What is claimed is:

1. A data transmission system comprising:
a proxy device configured for wired connection between a game server and a wireless network having a wireless access device, wherein the proxy device is configured to:
receive generated data from the game server, wherein the generated data relates to network gaming,
select one of plural modes for packetizing information representing the generated data according to a data loss rate and data transmission delay in the wireless network,
packetize the information representing the generated data in a packet according to the selected mode, wherein the information included in the packet differs depending upon which of the plural modes is selected,
send the packet to the wireless network, and
determine an upper limit of retransmissions of the packet to a mobile device coupled to the wireless network, in accordance with the data loss rate and the data transmission delay in the wireless network.

2. The transmission system of claim 1, wherein the proxy device provides a split connection for the game server that further is connected to the wireless network, the proxy device to transport data of the game server to the wireless network.

3. The transmission system of claim 1, wherein the proxy device is configured to send the packet to the wireless network that is a 3G wireless network.

4. The transmission system of claim 1, wherein the plural modes include:
a first mode in which the information packetized in the packet includes the generated data, and
a second mode in which the information packetized in the packet includes differential data representing a difference between the generated data in a given time slot and data in a reference time slot.

5. The transmission system of claim 4, wherein upon selection of the second mode, the proxy device is configured to optimize a number of time slots between the given time slot and the reference time slot in accordance with the data loss rate and the data transmission delay.

6. The transmission system of claim 5, wherein the generated data includes generated location data of an object in a virtual game world, wherein the packet is targeted to the mobile device that is configured to use the generated location data to make a prediction of a current location of the object.

7. The transmission system of claim 6,
wherein the proxy device is configured to select the mode from the plural modes to optimize the data loss rate and the data transmission delay and to reduce distortion of prediction of the current location of the object, wherein the distortion is an error of the predicted current location of the object relative to an actual current location of the object.

8. The transmission system of claim 4, wherein the plural modes further include:
a third mode in which the information packetized in the packet includes differential data representing a difference between the generated data in the given time slot and a previous time slot,
wherein in the second mode a number of time slots between the given time slot and the reference time slot is variably configurable by the proxy device.

9. The transmission system of claim 4, wherein the upper limit of retransmissions is set for a radio link control (RLC) layer of the wireless access device in the wireless network, the wireless access device to wirelessly communicate with the mobile device.

10. The transmission system of claim 4, wherein the proxy device is configured to apply differential coding to the generated data upon selection of the second mode.

11. A method of transmitting data from a game server to a mobile device coupled to a wireless network, comprising:
receiving, by a proxy device, generated data from the game server over a wired network, wherein the generated data relates to network gaming;
selecting, by the proxy device, one of plural modes for packetizing information representing the generated data according to a data loss rate and data transmission delay in the wireless network;
packetizing, by the proxy device, information representing the generated data in a packet according to the selected mode, wherein the information included in the packet differs depending upon which of the plural modes is selected; and
determining an upper limit of retransmissions of the packet to the mobile device in accordance with the data loss rate and the data transmission delay in the wireless network.

12. The method of claim 11, wherein the generated data includes generated location data of an object in a virtual game world, and wherein the packet is targeted to the mobile device that is configured to use the generated location data to make a prediction of a current location of the object.

13. The method of claim 12, wherein receiving the generated data comprises receiving the generated data from the data generation device that is a game server.

14. The method of transmitting data of claim 13, wherein the proxy device selects the mode from the plural modes to optimize the data loss rate and the data transmission delay and to reduce distortion of prediction of the current location of the object, wherein the distortion is an error of the predicted current location of the object relative to an actual current location of the object.

15. The method of claim 11, wherein the plural modes include:
a first mode in which the information packetized in the packet includes the generated data, and
a second mode in which the information packetized in the packet includes differential data representing a difference between the generated data in a given time slot and data in a reference time slot.

16. The method of claim 15, wherein a number of the time slots between the given time slot and the reference time slot is optimized in accordance with the data loss rate and the data transmission delay.

17. The method of claim 15, wherein the plural modes further include:
a third mode in which the information packetized in the packet includes differential data representing a difference between the generated data in the given time slot and a previous time slot,
wherein in the second mode a number of time slots between the given time slot and the reference time slot is variably configurable by the proxy device.

18. The method of claim 15, wherein the upper limit of retransmissions is set for a radio link control (RLC) layer of a wireless access device in the wireless network, the wireless access device to wirelessly communicate with the mobile device.

19. The method of claim 15, further comprising:
applying, by the proxy device, differential coding to the generated data upon selection of the second mode.

* * * * *

UNITED STATES PATENT AND TRADEMARK OFFICE
CERTIFICATE OF CORRECTION

| | | |
|---|---|---|
| PATENT NO. | : 7,883,419 B2 | Page 1 of 1 |
| APPLICATION NO. | : 11/669510 | |
| DATED | : February 8, 2011 | |
| INVENTOR(S) | : Gene Cheung et al. | |

It is certified that error appears in the above-identified patent and that said Letters Patent is hereby corrected as shown below:

In column 12, line 21, in Claim 1, delete "gaming," and insert -- gaming; --, therefor.

In column 12, line 24, in Claim 1, delete "network," and insert -- network; --, therefor.

In column 12, line 28, in Claim 1, delete "selected," and insert -- selected; --, therefor.

In column 12, line 29, in Claim 1, delete "network," and insert -- network; --, therefor.

Signed and Sealed this
Twentieth Day of December, 2011

David J. Kappos
*Director of the United States Patent and Trademark Office*